(12) United States Patent
McCormick

(10) Patent No.: US 11,555,732 B2
(45) Date of Patent: Jan. 17, 2023

(54) TANK MULTI-LEVEL MEASUREMENT USING THROUGH THE AIR MILLIMETER WAVE RADAR

(71) Applicant: Lasso Technologies, LLC, Dallas, TX (US)

(72) Inventor: Peter E. McCormick, Dallas, TX (US)

(73) Assignee: Lasso Technologies, LLC, Dallas, TX (US)

( * ) Notice: Subject to any disclaimer, the term of this patent is extended or adjusted under 35 U.S.C. 154(b) by 824 days.

(21) Appl. No.: 16/382,019

(22) Filed: Apr. 11, 2019

(65) Prior Publication Data

US 2019/0316951 A1    Oct. 17, 2019

Related U.S. Application Data

(60) Provisional application No. 62/691,139, filed on Jun. 28, 2018, provisional application No. 62/656,032, filed on Apr. 11, 2018.

(51) Int. Cl.
*G01F 23/284* (2006.01)
*G01S 13/08* (2006.01)
*G01F 23/18* (2006.01)
*G01F 23/80* (2022.01)

(52) U.S. Cl.
CPC .......... *G01F 23/2845* (2013.01); *G01F 23/18* (2013.01); *G01F 23/804* (2022.01); *G01S 13/08* (2013.01)

(58) Field of Classification Search
CPC .. G01F 23/2845; G01F 23/0076; G01F 23/18; G01S 13/08
See application file for complete search history.

(56) References Cited

U.S. PATENT DOCUMENTS

| | | | | |
|---|---|---|---|---|
| 5,440,310 A | * | 8/1995 | Schreiner | G01S 13/343 73/290 R |
| 5,900,546 A | * | 5/1999 | Wilkins | G01F 23/2962 73/290 V |
| 6,107,957 A | * | 8/2000 | Cramer | G01S 13/38 342/124 |
| 7,114,390 B2 | * | 10/2006 | Lizon | G01F 23/2967 73/290 R |

(Continued)

FOREIGN PATENT DOCUMENTS

CN          1971221 A        11/2006

*Primary Examiner* — Marcus E Windrich
(74) *Attorney, Agent, or Firm* — Locke Lord LLP

(57) ABSTRACT

Methods and systems for determining fluid levels in a tank comprise a mmWave Control unit configured to generate a millimeter wave chirp that ramps linearly from a starting frequency to a higher frequency within a specified time span. The mmWave Control unit transmits the chirp into the tank and receives one or more chirp reflections from the tank. The mmWave Control unit mixes the chirp with the chirp reflections to generate one or more intermediate frequency signals and processes the one or more intermediate frequency signals to derive one or more distances, each distance representing the distance from the top of the tank to one of the one or more fluids in the tank or an obstruction in the tank. A Telemetry Control unit automatically selects intermediate frequency signals having a signal strength above a predefined minimum or distances within a predefined distance window for further processing.

20 Claims, 12 Drawing Sheets

Assumes that Tx and Rx antennas are within 5mm so signal angle effects are negligible.

(56) References Cited

U.S. PATENT DOCUMENTS

| | | | | |
|---|---|---|---|---|
| 7,542,866 | B1* | 6/2009 | Lovegren | G01F 23/284 |
| | | | | 702/50 |
| 2002/0101373 | A1* | 8/2002 | Arndt | G01S 15/584 |
| | | | | 342/52 |
| 2004/0099815 | A1* | 5/2004 | Sfez | A61B 5/0073 |
| | | | | 250/492.1 |
| 2008/0236275 | A1* | 10/2008 | Breed | G01S 15/87 |
| | | | | 73/290 V |
| 2011/0181458 | A1* | 7/2011 | Feil | G01S 7/4056 |
| | | | | 342/124 |
| 2017/0008251 | A1* | 1/2017 | Pruett | H01Q 1/424 |
| 2021/0359758 | A1* | 11/2021 | Mizunuma | H04B 10/25752 |
| 2021/0403711 | A1* | 12/2021 | Buzinkai | H01Q 1/42 |
| 2021/0403713 | A1* | 12/2021 | Buzinkai | H01Q 1/421 |
| 2021/0407736 | A1* | 12/2021 | Lanagan | C04B 35/47 |

\* cited by examiner

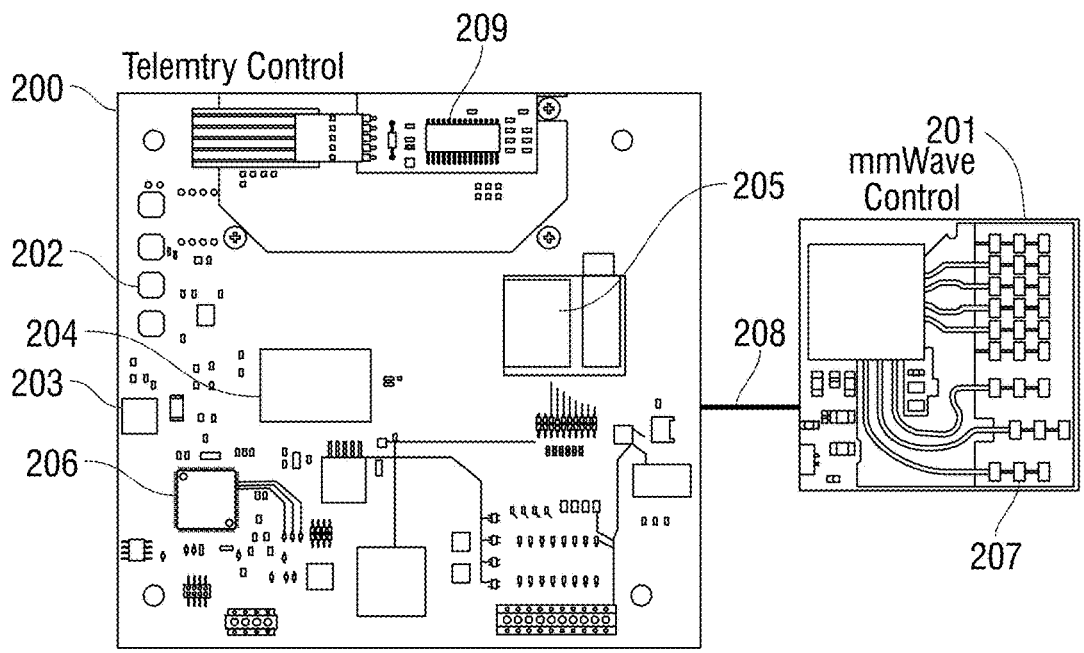
FIG. 2A
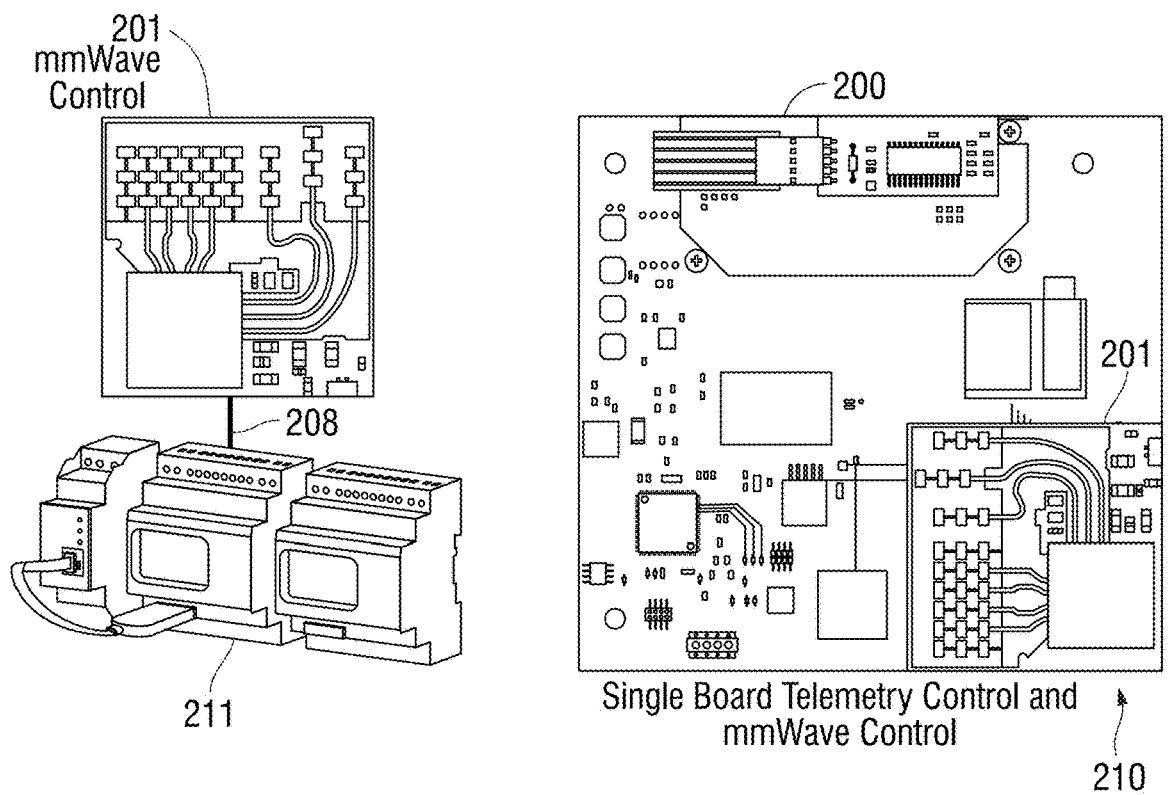
FIG. 2B
FIG. 2C

Fourier transform and Zoom transforms reveal multiple Frequency for each fluid layer.

TANK MULTI-LEVEL MEASUREMENT USING THROUGH THE AIR MILLIMETER WAVE RADAR

CROSS-REFERENCE TO RELATED APPLICATIONS

This application for patent claims the benefit of priority to and hereby incorporates by reference U.S. Provisional Application No. 62/656,032, entitled "Tank Multi-Level Measurement Using Through the Air Millimeter Wave Radar," filed Apr. 11, 2018, and U.S. Provisional Application No. 62/691,139, entitled "Tank Multi-Level Measurement Using Through the Air Millimeter Wave Radar," filed Jun. 28, 2018.

FIELD OF THE INVENTION

Embodiments of the invention relate generally to the use of radar to measure levels of fluids and other materials in a storage tank and particularly to the use of millimeter wave radar to measure such storage tank levels.

BACKGROUND

Storage tanks are used to store many types of liquids, such as oil, water, liquid fuels, liquid chemicals, and the like. It is important in many applications to be able to accurately measure the level of such fluids in a storage tank, for example, to detect loss due to leakage and/or theft, for automatic customer billing based on usage, and also to ensure a sufficient quantity of such fluids is available. Measuring a storage tank's fluid levels typically requires matching the liquid being stored with a particular sensing technology in order to accurately determine tank level. Chemical attributes, viscosity, pressure, temperature, environment, cost constraints, power-on time, power requirements, accuracy requirements, and other considerations may dictate what type of sensor can be used for a given liquid. This is made even more difficult when the tank contains multiple types of fluids with different attributes.

Accordingly, advancements are continually needed in the art of measuring storage tank levels.

SUMMARY OF THE DISCLOSED EMBODIMENTS

Embodiments of the invention use a millimeter wave (mmWave) radar system to measure levels of fluids and other materials in a storage tank. The mmWave radar system emits a chirp signal that reflects off objects and fluids and a return signal that is received by a receiving antenna. The received signal is mixed with the outgoing signal to generate a signal having an intermediate frequency which is directly proportional to the distance to one or more levels of fluid in the tank or obstructions. Extraneous obstructions and false signals can be filtered out to determine the desired distance by ignoring some resulting distances or lower signal strengths.

Thus, in general, in one aspect, one or more embodiments of the present disclosure are directed to a tank level instrument for measuring a distance from near a top of a tank to one or more fluids in the tank. The tank level instrument comprises, among other things, a chirp generator operable to generate a millimeter wave chirp that ramps linearly from a starting frequency to a higher frequency within a specified time span. The tank level instrument also comprises a transmit antenna configured to transmit the chirp generated by the chirp generator into the tank, and a receive antenna configured to receive one or more chirp reflections from the tank. The tank level instrument further comprises a mixer operable to mix the chirp transmitted by the transmit antenna with the chirp reflections received by the receive antenna to generate one or more intermediate frequency signals, and a processing unit operable to process the one or more intermediate frequency signals and derive one or more distances from the one or more intermediate frequency signals, each distance representing the distance from near the top of the tank to one of the one or more fluids in the tank or an obstruction in the tank. A computer is operable to automatically select intermediate frequency signals having a signal strength above a predefined minimum or distances within a predefined distance window for further processing and ignore other intermediate frequency signals and distances.

In general, in another aspect, one or more embodiments of the present disclosure are directed to a tank level instrument for measuring a level of fluid in a tank. The tank level instrument comprises, among other things, a mmWave Control unit configured to generate a millimeter wave chirp that ramps linearly from a starting frequency to a higher frequency within a specified time span. The mmWave Control unit is further configured to transmit the chirp into the tank and receive one or more chirp reflections from the tank. The mmWave Control unit is further configured to mix the chirp with the chirp reflections to generate one or more intermediate frequency signals and process the one or more intermediate frequency signals to derive one or more distances, each distance representing the distance from near a top of the tank to a fluid in the tank or an obstruction in the tank. The tank level instrument further comprises a Telemetry Control unit configured to automatically select intermediate frequency signals having a signal strength above a predefined minimum or distances within a predefined distance window for further processing.

In general, in yet another aspect, one or more embodiments of the present disclosure are directed to a method of measuring a level of fluid in a tank. The method comprises, among other things, generating a millimeter wave chirp that ramps linearly from a starting frequency to a higher frequency within a specified time span, transmitting the chirp into the tank, and receiving one or more chirp reflections from the tank. The method further comprises mixing the chirp with the chirp reflections to generate one or more intermediate frequency signals and processing the one or more intermediate frequency signals to derive one or more distances, each distance representing the distance from near a top of the tank to a fluid in the tank or an obstruction in the tank. Method further comprises automatically selecting intermediate frequency signals having a signal strength above a predefined minimum or distances within a predefined distance window for further processing.

In one or more embodiments of the tank level instrument, the starting frequency of the chirp is above 60 GHz and a bandwidth of the chirp is 4 Ghz or more, and the processing unit is operable to process the one or more intermediate frequency signals using Zoom Fourier transform.

In one or more embodiments of the tank level instrument, an enclosure is mounted on the tank over an opening in the tank, the enclosure isolating the chirp generator, the transmit antenna, the receive antenna, the mixer and the processing unit from the tank, the enclosure being made partly or entirely of a material having a dielectric constant that is sufficiently low to allow the chirp and the chirp reflections to pass through the enclosure with a signal strength loss that is less than a specified minimum.

In one or more embodiments of the tank level instrument, the material of the enclosure has a dielectric constant that is less than 5, the material of the enclosure is impervious to the one or more fluids in the tank, the same enclosure also isolates the computer from the tank, and the computer is operable to ignore distances representing the distance between the top of the tank and chemical residue that may collect on the enclosure.

In one or more embodiments of the tank level instrument, the computer is operable to ignore distances that represent the distance between the top of the tank and one or more of foam, gas, fog, mist, ice, sand, debris, chemical residue, and obstructions in a tank. In one or more embodiments of the tank level instrument, wireless telemetry is connected to the computer and operable to transmit the distances selected by the computer to a remote location, where the wireless telemetry includes one or more of cellular telemetry and satellite telemetry.

In one or more embodiments of the tank level instrument, the computer is further operable to identify a dissimilar fluid interface by determining whether a first intermediate frequency signal is followed by a second intermediate frequency signal having a lower signal strength than the first intermediate frequency signal, both the first and second intermediate frequency signals having signal strengths above the minimum.

In one or more embodiments of the tank level instrument, the tank level instrument a self-contained unit, the Telemetry Control may include a only visual display for a user to determine a fluid level or fluid volume, the processing unit is operable to send the one or more intermediate frequency signals to an external computer for further processing.

In one or more embodiments of the tank level instrument, an open-sided horn is connected to the transmit antenna, the open-sided horn composed of two plates connected to each other at an angle.

BRIEF DESCRIPTION OF THE DRAWINGS

The foregoing and other advantages of the disclosed embodiments will become apparent upon reading the following detailed description and upon reference to the drawings, wherein:

FIGS. 2A-2C illustrate an exemplary implementation of a tank level measurement instrument in accordance with various embodiments of this disclosure;

DETAILED DESCRIPTION OF THE DISCLOSED EMBODIMENTS

Figure 1:
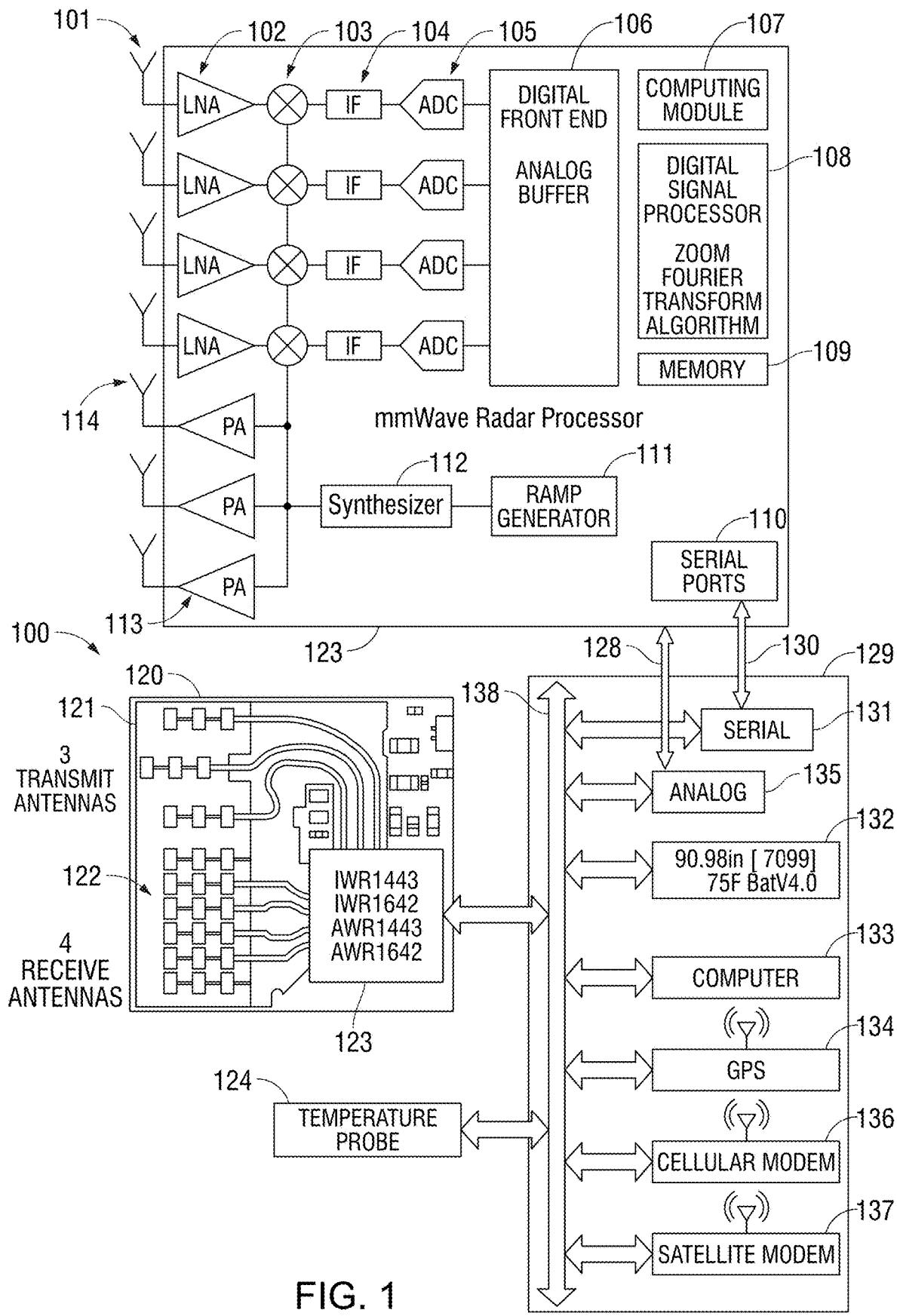
FIG. 1 illustrates a block diagram of an exemplary tank level measurement instrument in accordance with various embodiments of this disclosure.

As an initial matter, it will be appreciated that the development of an actual, real commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

As mentioned earlier, embodiments of the invention use a millimeter wave (mmWave) radar system to measure levels of fluids and other materials in a storage tank. A mmWave radar is a type of radar that uses short electromagnetic waves, typically only a few millimeters in wavelength (and hence high in frequency), to produce highly accurate measurements. The mmWave radar system emits a high-frequency chirp signal that reflects off objects and fluids and is received as a return signal by a receiving antenna. The received signal is mixed with the outgoing chirp signal to generate a signal having an intermediate frequency which is directly proportional to the distance from the chirp signal emitter (e.g., an antenna located at the top of the tank) to one or more levels of fluid or obstructions in the tank. Extraneous obstructions and false signals can be filtered out to determine the desired distance by ignoring some resulting distances or lower signal strengths.

The invention, in some embodiments, operates in the 60-64 GHz range or 76-81 GHz range, depending on FCC requirements, with a wavelength of about 4 mm. These embodiments can detect distances from a point on the tank, usually the top of the tank, to fluid in the tank with accuracy less than a millimeter, which is critical in many fluid monitoring applications. High-frequency radar is also largely impervious to plastics and similar materials that are used in many fluid monitoring applications to isolate the sensor from the fluid and also to ease equipment installation effort.

In addition, radar circuits such as the Texas Instruments (TI) mmWave family of integrated circuits provide compact methods of processing the necessary signals to determine distance. The compact size of these radar circuits makes them particularly well suited for space constrained applications, as is the case for many storage tanks. The variations among the TI mmWave family (e.g., AWR1443, AWR1642, IWR6843) have different attributes depending upon needs, but the underlying technology used is the same.

The mmWave technology used in some embodiments of the invention is called frequency modulated continuous wave (FMCW). FMCW continuously transmits a frequency modulated signal to determine range, velocity, and angle of the object being detected relative to the antenna plane. Weather and aircraft radar, on the other hand, typically use pulsed-radar systems which transmit short pulses and measure the time of flight for the signal to return to the antenna. Time-of-flight based accuracy is not in the millimeter range and thus pulsed-radar systems are not suitable for tank level measurements. Other radar-based tank depth measurement systems use Time Domain Reflectometry. These systems are more complex and expensive than mmWave systems and do not have the capabilities of the mmWave based invention described herein.

The invention in some embodiments employs a single-chip sensor having mmWave measurement capability, such as one of the TI family of mmWave sensors. This single-chip sensor preferably uses FMCW radar operating in the 60-64 GHz band or 76-81 GHz band with a 4 GHz chirp. The sensor also includes multiple transmit and receive antennas with phase-locked loops and analog-to-digital converters. On-board Digital Signal Processors are used for the receivers to control and calibrate the signals. A built-in radio processor is used to mix transmitted and received signals. A processor runs Zoom or similar Fourier transforms on the signals to directly determine distance. These single-chip sensors can provide range, angle, and velocity determination, all in a small package.

Embodiments of the invention can advantageously be used on very caustic chemical tanks since they totally isolate the sensor from the tank fluid. Currently only costly sensors are capable of accurately measuring tank levels which contain aggressive and corrosive chemicals, so a low-cost solution is needed in the industry. Embodiments of the invention do not require a corrosion resistant sensor and can use a much more cost-effective sensor due to the novel and inventive methods used. In addition, embodiments of the invention are impervious to sand, dirt and debris build up because of the novel and inventive methods used. The sensing distance of the disclosed embodiments can be up to 60 ft in some cases while still maintaining millimeter precision, which is particularly useful for tall storage tanks. The disclosed embodiments provide a cost-effective sensor that is able to determine volume in tanks containing a wide variety of chemicals and is not hindered by foam, mist, gas, fog, ice, sand, debris, and chemical residue. Frothing foam and gases are often generated by the fluid being monitored and can create havoc with other types of sensing technologies like ultrasonics, which tend to get false echoes. The cost-effective tank level sensing solution disclosed herein can be used on many types of chemicals and tanks without having to match the sensing technology to the particular tank application.

Tank level sensing is provided via a mmWave chip mounted on a circuit board that, in accordance with one or more embodiments, is housed in a rugged plastic enclosure to protect it from the environment and tank fluids. Software in the mmWave chip configures the circuit board's radar for use in the tank and sends data representing the millimeter wave readings to an external control. The software filters the data to include only the most prominent reflections, a range of detected fluids and obstructions, or the distances to all of the detected objects. The external control, when used, parses the data to determine obstructions and distances to the levels of different fluids within the tank. The external control can also use the tank dimensions, once received, to filter out undesirable (e.g., nonsensical) level readings. Relevant levels and volume can be shown to the user on a display. This data is often transmitted wirelessly using satellite or cellular telemetry methods for display on web sites where information emails and alerts and reports can be generated depending upon the end user's needs. The external control can also compare previous measurements with new measurements to detect false measurements in some embodiments.

The disclosed embodiments employ several transmit and receive antennas which are unlike other tank level monitoring methods. Typically, the send and receive antenna are the same physically, such as in the case of aircraft or weather radars or even other tank level monitoring radar sensors. Multiple antennas are used on the disclosed embodiments to simplify circuitry and also so that a slight change in arrival time of an adjacent antenna's signal can be used to determine the angle from which the radar signal was sent. Following is a more detailed description of various embodiments of the invention.

Referring now to FIG. 1, a block diagram of a tank level measurement instrument 100 according to an embodiment of the invention is shown. The tank level measurement instrument 100 primarily comprises a mmWave Control unit 120 and a Telemetry Control unit 129. The mmWave Control unit 120 uses a TI mmWave radar processor integrated circuit 123, which may be TI part number IWR1443, IWR1642, IWR6843, AWR1443, AWR1642, or the like. Circuit 123 has a ramp generator 111 which works with a synthesizer 112 to generate the chirps needed for distance determination. These chirps have a frequency and duration that may be customized as needed using a computing module 107. A receive antenna 101 is provided for receiving chirp reflections and a transmit antenna 114 is provided for transmitting the chirps. There are four such receive antennas (indicated at 122) and three such transmit antennas (indicated at 121) in some embodiments. The transmit antennas 114 transmit the chirp signals which are amplified by amplifiers 113. Multiple antennas are used when angle measurements are important. Low noise amplifiers (LNA)

102 are provided for each of the four receive antennas. An RF Fresnel (not expressly shown) or other type of focusing lens may be used in some embodiments to focus the chirp RF beam to a narrower width. Mixers 103 multiply the signal currently being transmitted with a returned signal that was previously transmitted a few moments ago. The product of the mixer 103 creates an intermediate frequency (IF) signal 104 which is sent to an analog-to-digital converter 105. A digital front end 106 receives the converted signals and quickly digitizes and stores their values in its analog buffers for use by a digital signal processor 108, which performs digital signal processing of the received signals using the Zoom Fast Fourier transform to determine distance. Computing module 107 works with memory 109 to choreograph all of the digital signal processing and other functions. Serial port 110 sends the determined distance values for each of the desired tank levels to an external control such as Telemetry Control unit 129.

Telemetry Control unit 129 may be used to display tank level data to the user and/or it may be used to send tank level information to an external web site and generate informative emails, charts and graphs of the tank contents as well as possibly showing the GPS location of the tank. This tank level Telemetry Control unit 129 (including a display therefor) may be physically co-located with the mmWave Control unit 120 but is typically located on the side of the tank for easier access by the user so he/she does not need to precariously climb on the tank to read the levels. Tank level data may be transmitted as a serial signal 130 to the Telemetry Control unit 129 over serial port 110 and received by the Telemetry Control unit 129 at serial port 131. The tank level data may additionally (or alternatively) be sent via an analog voltage or 4-20 mA signal 128 to the Telemetry Control unit 129. The signal 128 is usually the strongest signal representing a tank level that lies within a desired range of tank levels. Note that the tank level is typically the distance from the top of the tank to the fluid, but may also be the distance from another reference point on the tank to the fluid, depending on where the transmit antenna is located on the tank. In some embodiments, however, the tank reference point may be a software implemented reference point that is different from the location of the antenna. The tank level data is sent from serial port 110 to serial port 131 in millimeter-accurate distances and signal strengths approximately once every second. Many distances and signal strengths may be sent per sample and it is up to a computer 133 in the Telemetry Control unit 129 to determine which signal strengths and/or which distances are important. Likewise, computing unit 107 in the mmWave Control unit 120 may only send the distance with the strongest signal to computer 133 for simple tank level measurements. Typically, the computing unit 107 only selects the level that is within a known range associated with a stronger signal level. All data is transferred to computer 133 over bus 138. An OLED display (not expressly shown) may show diagnostics, temperature, and current tank level depth, as well as the number of gallons, barrels, and/or liters, and remaining battery voltage to the user. Temperature probe 124 such as a 1-wire DS1821 may be used to measure fluid temperature where needed. GPS location is taken with GPS circuit 134. Telemetry Control unit 129 may transmit data to a remote site using a cellular modem 136 or satellite modem 137.

FIGS. 2A-2C show an exemplary implementation of the tank level measurement instrument in the form of circuit boards. The tank level measurement instrument in this embodiment comprises a mmWave Control unit 201 and a Telemetry Control unit 200 which interprets messages from the mmWave Control unit 201. The mmWave Control unit 201 is similar to the mmWave circuit 120 from FIG. 1 and the Telemetry Control unit 200 is similar to the Telemetry Control unit 129 from FIG. 1. An antenna array is indicated at 207. The Telemetry Control unit 200 in this example is comprised of GPS circuit 203, main computer chip 206 which interprets and presents data to the end user, satellite modem 204, cellular modem 205, setup programming keypad 202, and OLED display 209. The keypad 202 and display 209 are used to program and define undesirable obstructions in the tank, desired tank level windows, and distance to the bottom of the tank. The keypad 202 is also used to configure how often GPS and tank level data is transmitted if the Telemetry Control unit 201 is used. Serial data line 208 between the Telemetry Control unit 201 and the mmWave Control unit 200 transfers distance readings to the Telemetry Control unit. The serial data can be sent via line 208 directly to one or more PLCs 211 or other processing plant computers, as shown in FIG. 2B, if the Telemetry Control unit 200 is not needed. The serial data is comprised of pairs of distance and signal strength as discussed later herein in FIG. 9. The PLC 211 would need to parse the distance and signal power data pairs just as the Telemetry Control unit 200 word normally do. Where the Telemetry Control unit 200 is used, the serial data line 208 may be less than an inch (e.g., 0 inches) long or several hundred feet depending upon if this is a self-contained mmWave Control/Telemetry Control unit or a mmWave Control unit that is located remotely from the Telemetry Control unit. Thus, in some embodiments, the mmWave Control unit 201 and Telemetry Control unit 200 may be co-located or housed together for use on small tanks, or they may be separately located for larger tank installations. The Telemetry Control unit 200 may have a computer 206 to analyze the data from the mmWave Control unit 201, and the display 209 for the user to show diagnostics, level and volume. Likewise, the Telemetry Control unit 200 and the mmWave Control unit 201 may be located on the same circuit board. FIG. 2C shows an example of a single-board embodiment, indicated at 210, where the Telemetry Control unit 200 and the mmWave Control unit 201 are implemented on a single board.

Figure 3:
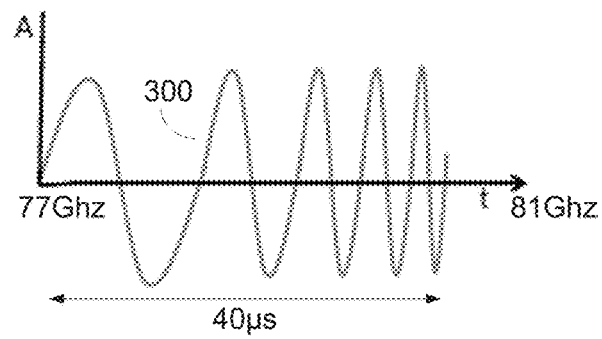
FIG. 3 illustrates an exemplary chirp signal for a tank level measurement instrument in accordance with various embodiments of this disclosure.

FIG. 3 shows an exemplary chirp signal 300 that may be used for distance determinations according to one or more embodiments. The chirp signal 300 resembles a typical chirp signal emitted by FMCW radars, which transmit a chirp signal having a frequency that increases linearly with time. In this example, the vertical axis is amplitude (A) and the horizontal axis is time (t). The chirp signal 300 lasts about 40 μs, starts at a frequency of about 77 Ghz and ends at about 81 Ghz, or starts at about 60 Ghz and ends at about 64 Ghz, for a total bandwidth of about 4 Ghz. Other chirp signals having different bandwidths and durations may of course be used depending on the particular fluid and application.

Figure 4:
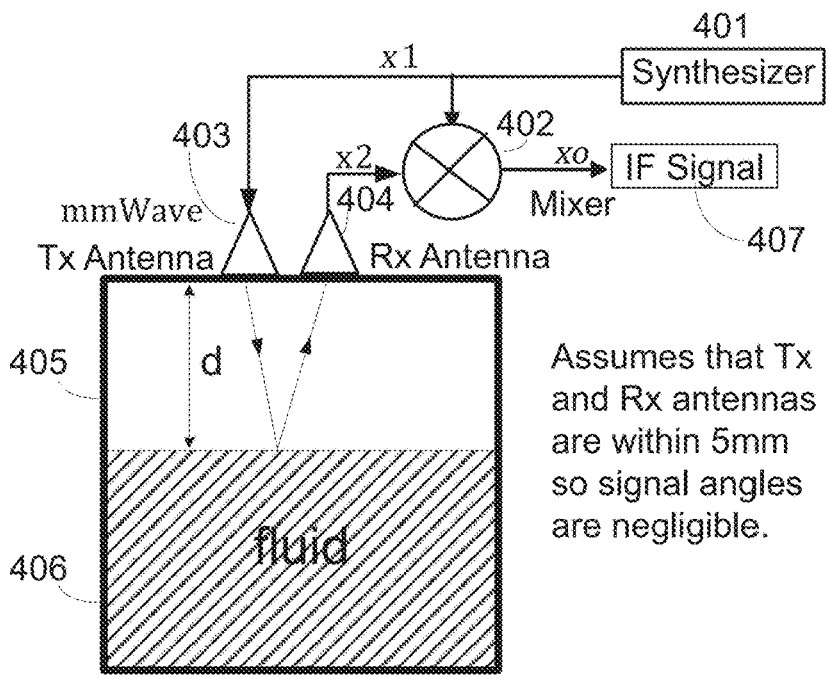
FIG. 4 illustrates an exemplary synthesizer for a tank level measurement instrument in accordance with various embodiments of this disclosure.

FIG. 4 shows an exemplary synthesizer 401 that may be used to generate a brief chirp that is transmitted by a transmit TX antenna 403 into a tank 405 containing a fluid 406. Multiple transmit antennas 403 may be used when signal angle determination is needed, which is not usually the case for tank level measurements. The reflection of the chirp by the fluid 406 is received by a RX antenna 404. A mixer 402 multiplies the RX antenna and TX antenna signals to produce an intermediate frequency (IF) signal 407. The chirp profile such as the bandwidth may be custom designed for the fluid being monitored. Note that the instantaneous transmitted signal frequency is higher than the instantaneous received signal (i.e., echo) frequency at that instant since the echo was initially transmitted at the beginning of the chirp and the frequency has ramped up during the travel time of the reflected echo off the fluid. The difference between the instantaneous transmitted frequency and instantaneous received frequency is used by the mmWave Control unit to determine distance.

In the FIG. 4 example, assume the chirp signal may be represented using the following sinusoidal signal, where x is amplitude, f is frequency and $\Phi$ is phase:

$$x_1 = \sin(2\pi f t_1 + \Phi_1) \text{Transmitted signal}$$

$$x_2 = \sin(2\pi t_2 + \Phi_2) \text{Received signal}$$

When the transmitted signal and received signal is mixed by the mixer 402, the resulting output IF signal $x_o$ has a frequency equal to the difference between the instantaneous frequencies of the two input signals. The phase of the output signal $x_o$ is the difference of the phases of the transmitted and received signals. Thus, the intermediate frequency (IF) can be expressed as:

$$x_o = \sin[(f_1 - f_2) 2\pi t + (\Phi_1 - \Phi_2)]$$

where T=2d/c is the time of flight of the transmitted and received signals, d is the distance (in meters) to the object from which the transmitted signal is reflected; $\lambda$ is the wavelength for the mmWave chirp and is about 4 mm, and c is the speed of light or about 3e8 (300,000,000) meters/second.

The IF signal is a tone with a constant frequency coming out of the mixer 402. The IF signal is valid only when the TX and RX signal overlap. The IF signal out of the mixer 402 can be represented as a sine wave commonly seen in RF signal processing:

$$x_o = A \sin(2\pi f t + \phi)$$

where f is the difference between $f_1$ and $f_2$, A is the amplitude, $\phi = 4\pi d/\lambda$ is the phase, S is the rate of change of the chirp frequency during the chirp, which in the current example is 4 Ghz/40 µS=100 Mhz/µs=100e12. The frequency f can also be expressed as:

$$f = 2Sd/c$$

Rearrangement of the above terms produces:

$$d = fc/2S = f(3e8)/(2*100e12) = f*1.5e-6.$$

Thus, for example, an IF signal having frequency difference f of 1 Mhz would produce a distance determination of d=1e6*1.5e-6=1.5 meters.

Figure 5:
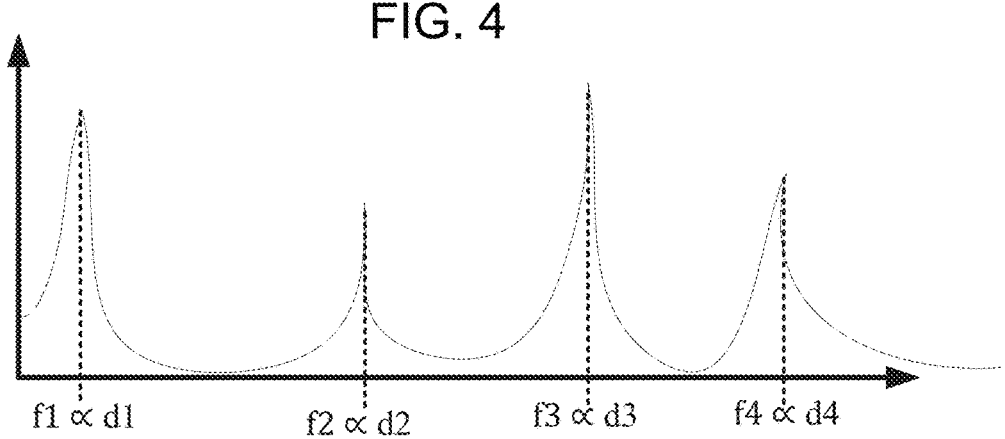
FIG. 5 illustrates exemplary signal reflections for a tank level measurement instrument in accordance with various embodiments of this disclosure.

FIG. 5 shows an example where there are multiple objects or fluid layers in the tank, resulting in multiple signal reflections (i.e., echoes). As can be seen, there are multiple IF tones because each chirp is delayed by a different amount of time proportional to the distance to the particular fluid interface or object that reflected the chirp. Each frequency difference (e.g., f1, f2, f3, f4, etc.) resolved by Zoom Fourier Transform is directly proportional to the distance (e.g., d1, d2, d3, d4, etc.) to the fluid. Fourier transforms are well-known techniques for converting a time domain signal into the frequency domain. Zoom Fourier Transform is an additional signal processing technique commonly used to analyze a portion of frequency spectrum at very high resolution, which allows for highly accurate distance determinations. A frequency translation may be used to shift the frequency range of interest down to near 0 Hz, and a low-pass filter prevents aliasing, thereafter resampling may be performed at a lower rate. Zoom Fourier Transform processing is performed individually on each of the IF signals (e.g., by the mmWave Digital Signal Processor 108 in FIG. 1) to determine the frequencies of the independent IF signals so distance to each corresponding fluid boundary or obstruction can be determined.

Figure 6A:
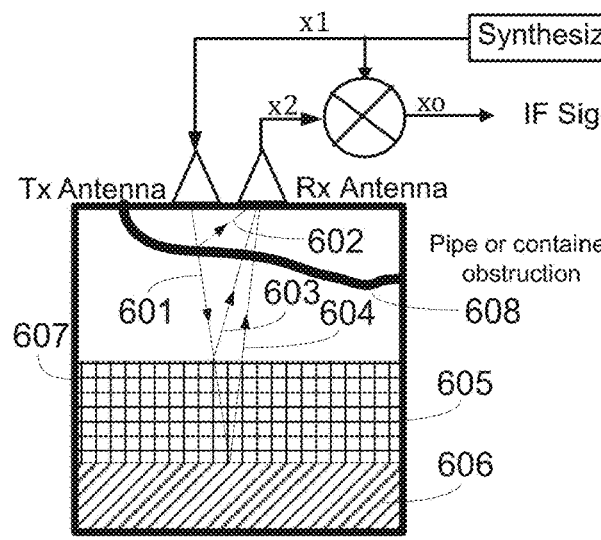
FIGS. 6A-6C illustrate an exemplary signal processing for a tank level measurement instrument in accordance with various embodiments of this disclosure.
Figure 6C:
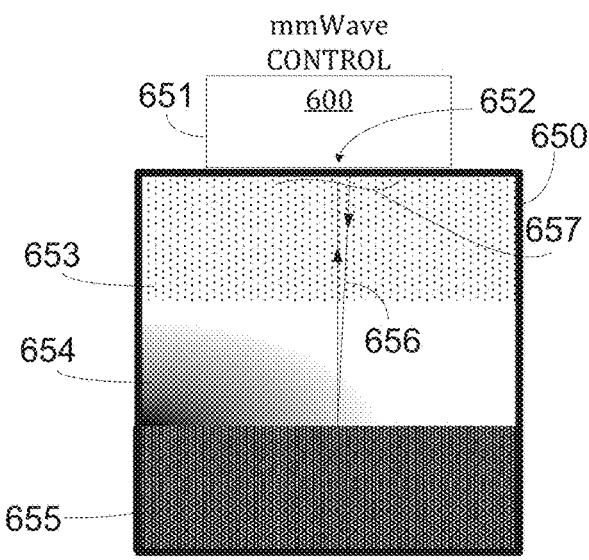
Figure 6B:
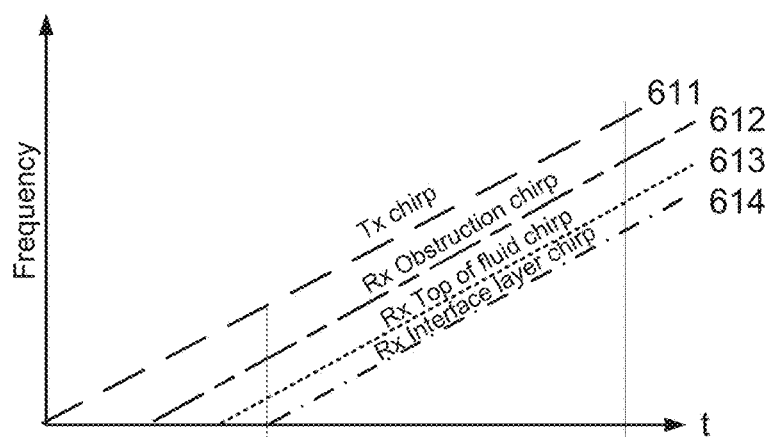
Figure 6B:
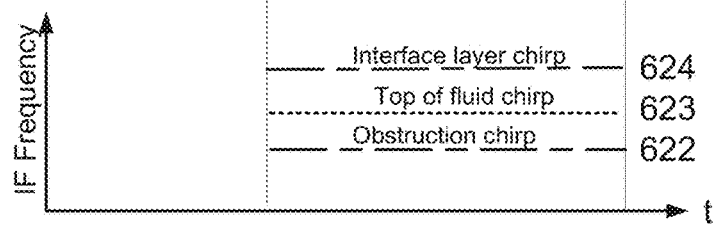

FIGS. 6A-6C show the RF signal path in a typical tank with obstructions and two distinct fluids with different attributes. Referring to FIG. 6A, a chirp 601 is emitted by a transmit TX antenna to measure the distance to the two layers of fluids, a top fluid layer 605 and a bottom fluid layer 606, in the tank 607. A reflected signal 602 represents some of the RF energy from the chirp 601 being reflected by an obstruction 608 in the tank. The obstruction 608 may include braces, pipes, and other objects commonly found in tanks. Reflected signals resulting from an obstruction 608, such as the signal 602, are ignored for distance determination purposes. Another reflected signal 603 represents some of the RF energy from the chirp 601 being reflected off the top layer of the fluid 605 back to a receive RX antenna. Yet another reflected signal 604 represents some of the RF energy being reflected off an interface or boundary between the two fluids 605 and 606 due to, for example, differing specific gravities causing the lighter fluid 605 (e.g., oil) to sit on top of the heavier fluid 606 (e.g., water). Determining the difference in levels between oil and water and other disparate chemicals in a tank is important in the petroleum industry.

FIG. 6B depicts charts showing the frequency (vertical axes) of the various signals changing over time (horizontal axes). In the figure, line 611 represents the transmitted chirp showing that its frequency increases over time. Line 612 represents the reflected signal 602 from the obstruction and shows that the reflected signal will arrive at the receive RX antenna first. The reflected signal has an instantaneous frequency close to the transmitted chirp frequency, since the chirp was the most recently transmitted signal. Line 613 represents the reflected signal 603 from the top of the first fluid and line 614 represents the reflected signal 604 from the interface or boundary between the top and bottom fluids. Line 622 represents the intermediate frequency (IF) of the reflected signal 602 and shows that the obstruction produces the lowest frequency of the three reflected signals. This frequency typically results in a distance determination that is outside the expected range and thus can be ignored. Line 623 represents the intermediate frequency (IF) of the reflected signal 603 and shows that the top of the fluid produces the next highest frequency. This frequency will usually result in a usable distance determination. Line 614 represents the intermediate frequency (IF) of the reflected signal 604 and shows that the fluid interface layer produces the highest frequency of the three signals. This frequency will also usually result in a usable distance determination.

Referring to FIG. 6C, in some embodiments, the mmWave Control unit 600 is housed in an enclosure 651 having a window 652 through which signals may pass into the tank 650. Any suitable attachment means may be used to mount the enclosure 651 on the tank 650, such as 2-inch screws on the underside of the enclosure 651, since many tanks have corresponding 2-inch threaded holes. The enclosure 651 is made either partly or entirely of a material that can resist the chemical effects of the liquid being monitored and has a low dielectric constant so that most of the RF transmitted and received energy is not dissipated. Window 652 may be, or may include, a low dielectric cover or barrier against the fluid in the tank to allow mmWave Control unit 600 to be used with many different types of chemicals and liquids. For example, the tank 650 may hold a liquid 655 that may have foam 654, in which case the chirp will produce a partial reflection 656 off the foam 654. In some cases, there may also be gases 653 above the liquid 655. Sand or sludge 657 collecting just below the window/barrier 652 are either not detected because such substances have a low dielectric or the distance thereto is outside the outside the expected range and ignored.

In contrast, tank level measurement methods that require a probe, such as methods that rely on time domain reflectometry down a guide wire into the tank fluid, have severe limitations with respect to certain chemicals and acids. As well, pressurized tanks create problems with hydrostatic sensors and installation is difficult. Tank level measurement methods that employ ultrasonics are thrown off by gases and foams and are susceptible to buildup and chemical attack. Embodiments of the invention are impervious to most of these real-world tank level difficulties because the invention can be isolated from the fluid in the tank and the mmWave signals work well with a variety of chemicals. Since plastic obstructions, foam and gases have a lower dielectric than most fluids, they can be ignored by using appropriate software filters, thus allowing the mmWave radar embodiments disclosed herein to determine the desired liquid levels.

The mmWave radar has a range resolution of c/2B where c is the speed of light and B is the radar bandwidth. Thus, for a radar chirp having a bandwidth of 4 Ghz, for example, the range resolution or distance between different chemical layers of the tank or obstructions can be no closer than 3.75 cm from one another. Note that this range resolution of 3.75 cm should not be confused with the measurement accuracy of less than 1 mm. Increasing the bandwidth of the chirp improves the ability of the radar to distinguish between adjacent objects or levels in the tank. Each IF signal has a frequency that is proportional to the corresponding distance to an object or fluid that resulted in the IF.

Once the frequency is determined for each fluid layer or obstruction, the distance equation explained earlier, d=fc/2S, is run for each frequency. Each frequency is indicative of a reflection from that liquid, an interface, or an object, and is correlated back to distance. From there, distances corresponding to known obstructions or tank limitations (e.g., dimensions) are ignored.

Figure 7:
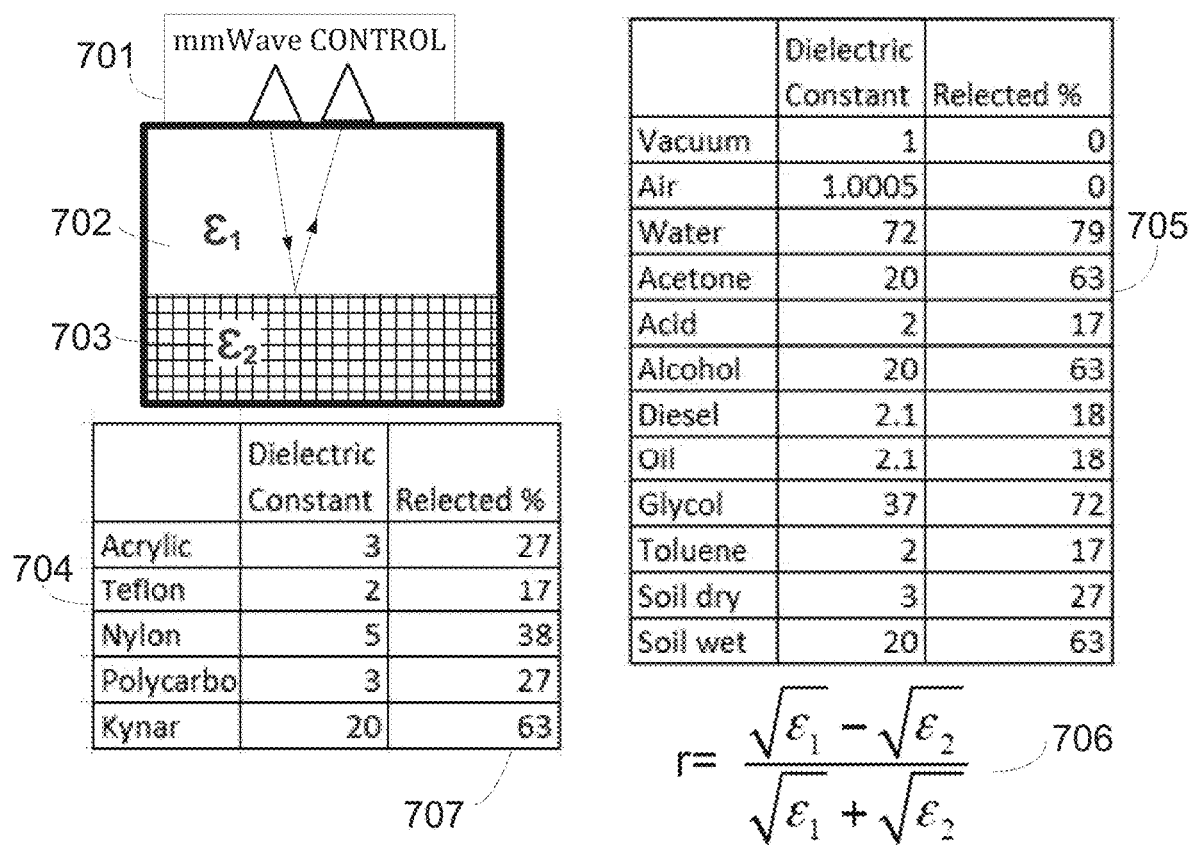
FIG. 7 illustrates exemplary dielectric constants that may be used in a tank level measurement instrument in accordance with various embodiments of this disclosure.

FIG. 7 shows examples of materials and their dielectric constants that may be relevant in one or more embodiments. In general, the dielectric constant ε of a material or fluid will dictate how much of the transmitted energy is returned back to the receiver in the mmWave Control unit 701. As the figure shows, the dielectric constant ε for air 702 is typically 1.0005, which results in minimal losses and reflections. Table 705 lists the dielectric constant of typical tank fluids and a reflection percentage (%) under ideal conditions. Table 704 shows the dielectric constant of different possible materials that may be used for the window/barrier 652 (FIG. 6C) and tank materials. Column 707 lists the reflection percentage (%) of some materials that are used in fluid tanks. These low dielectric constants show that reflections are typically lower than the fluid reflectivity in table 705. Reflectivity equation 706 assumes perpendicular polarization of a plane wave on a flat surface. Low loss and non-magnetic materials allow the intrinsic impedance to be real and ignores the imaginary frequency dependent portion of the dielectric constant since its effects are relatively inconsequential through air. A higher dielectric constant of the target fluid or object reflects a larger portion of the transmitted signal. A low dielectric constant will allow much of the signal to continue through the fluids. Higher dielectric constants will return most of the transmitted power, as shown in FIG. 7, which represents roughly the reflection percentage (%) of the signal that is returned assuming ideal conditions.

Figures 8A, 8B:
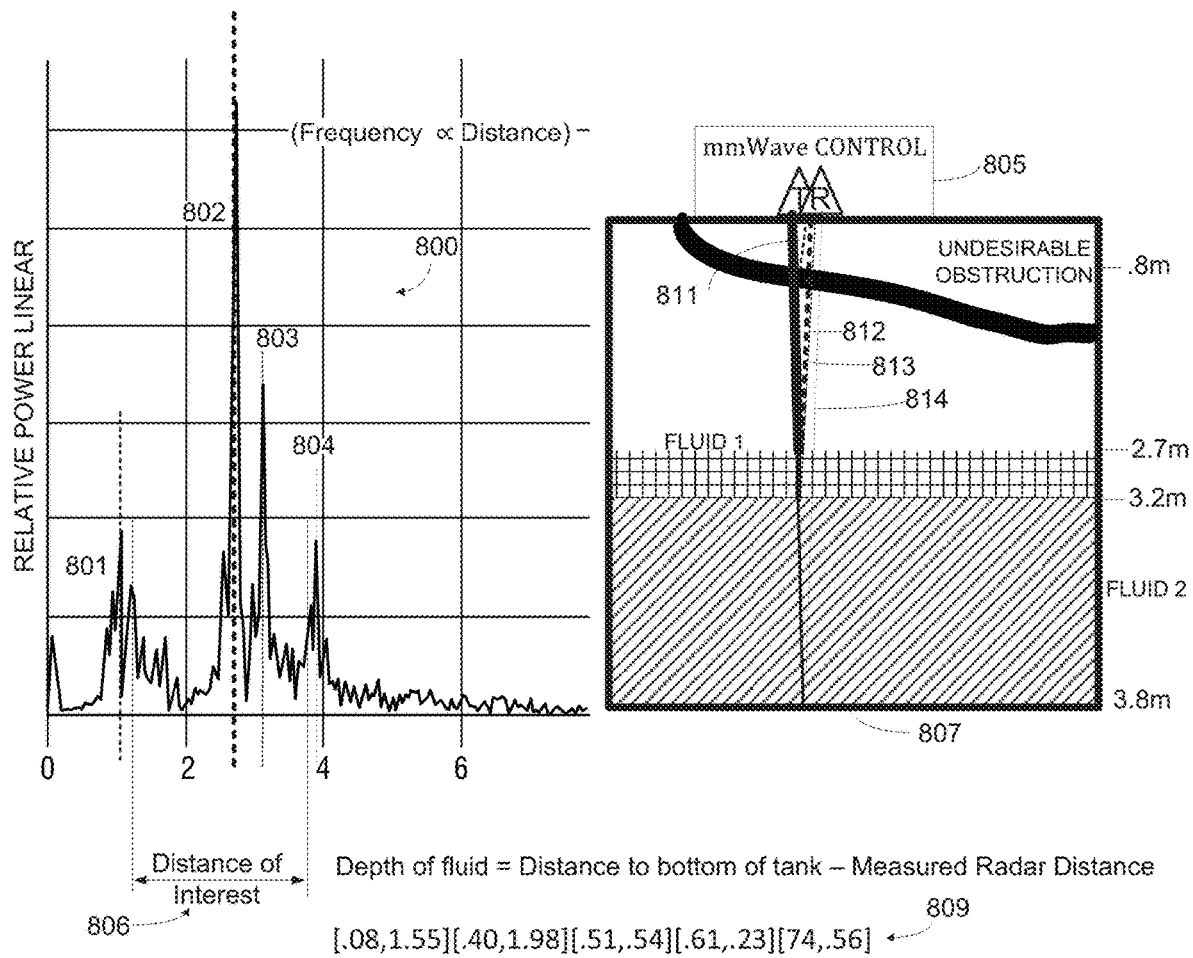
FIGS. 8A-8B illustrate exemplary tank level measurements for a tank level measurement instrument in accordance with various embodiments of this disclosure.

FIG. 8A depicts a plot 800 of relative power (vertical axis) versus distance (horizontal axis) reading in a typical tank. Several peaks 801, 802, 803, 804 in the plot are of interest and correspond with peculiarities in the tank measurement. A Telemetry Control unit (e.g., Telemetry Control unit 200, FIG. 2) keeps track of each of the distance-relative power readings and can ignore certain distances which are not within the anticipated tank level dimensions or relative power levels. For example, if the fluid level is only valid (i.e., expected) between 0.05 m and 2.7 m deep, and the tank is 3.8 m tall, any determined distance between 3.75 m (i.e., 3.8 m−0.05 m) and 1.1 m (i.e., 3.8 m−2.7 m) are valid. Many [distance, power level] pairs, indicated at 809, are returned by the mmWave Control unit 805. Readings outside of the distance of interest 806 are ignored by the Telemetry Control unit since those readings indicate an obstruction in the tank or a reflection off the bottom of the tank 807, such as peak 804 which is outside the distance of interest 806.

FIG. 8B illustrates a chart 810 showing a method that may be used for difficult or challenging tank level measurement situations in accordance with one or more embodiments. The chart 810 may be produced, for example, by computer 133 of the by the Telemetry Control unit 129 (see FIG. 1) which may keep a record of the last N distance readings, as shown in an array 812. "Bad" readings 811 that do not correlate (e.g., within a certain predefined percentage) with most or a majority of recent samples can be discarded. The power readings are used to focus on the more prominent readings from the many possible distance and power levels sent to computer 133 by the mmWave Control unit. This is just one of many methods of mathematically isolating valid level readings.

Figure 9:
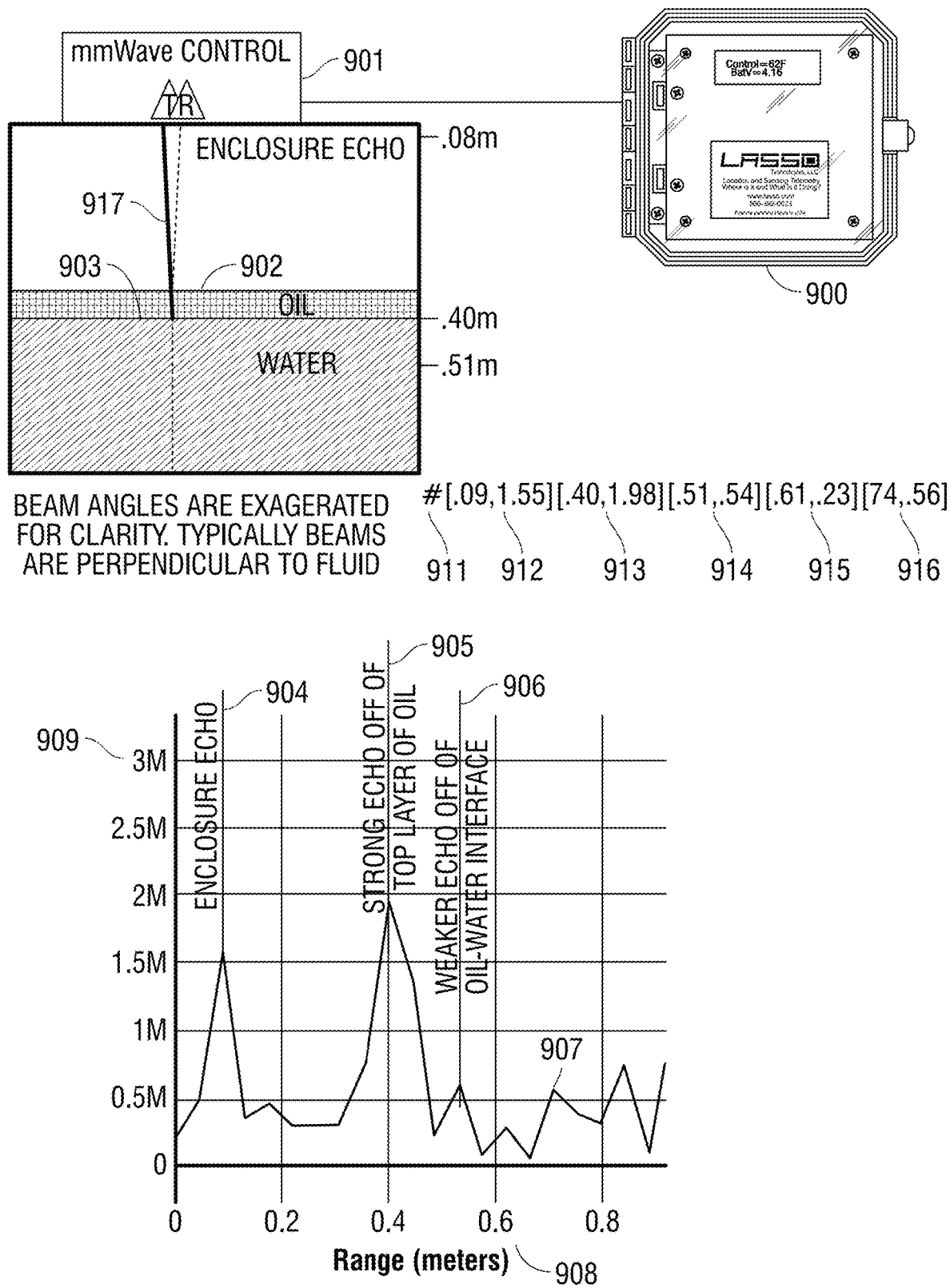
FIG. 9 illustrates an exemplary method of determining an oil-water interface for a tank level measurement instrument in accordance with various embodiments of this disclosure.

FIG. 9 illustrate a method of determining the oil-water interface within a tank in accordance with one or more embodiments. In the petroleum industry, oil produced from a well often has water mixed in it. Producers pump this oil-water mixture into holding tanks where the mixture is allowed to settle. Oil is less dense than water so it sits on top of the water. Producers want to know the water and oil levels and thus profitability in a tank, but the ability to determine these two levels has proven difficult and expensive. As discussed previously, embodiments of the invention discern the distance and signal levels at each layer within the tank and this method can be used to determine the oil-water interface, even though the signal levels are extremely low after they pass through the fluid layers.

In FIG. 9, a mmWave Control unit 901 transmits a radar chirp 917 into a tank 910. The chirp 917 first passes through the enclosure wall of the mmWave Control unit 901 and produces a distance pulse 904 at distance 0.09 m as shown on horizontal axis 908. The vertical axis 909 shows signal level in relative power. A strong portion of the radar pulse is reflected off of the air-oil interface 902, which creates a pulse 905 indicative of the top of the oil surface 902 at 0.40 m. This air-oil interface 902 produces the strongest distance pulse and echo. The remainder of the signal passes through the oil and reflects off of the oil-water interface 903 because of the difference in the dielectric constants of oil and water. The reflection off the oil-water interface produces a weaker pulse and echo 906 at 0.51 m. The remainder of the signal travels through the water and is echoed off of the bottom of the tank 910 with spurious echoes 907. The Telemetry Control unit 900 reads the distances and signal levels from the mmWave Control unit 901. The data string has the format [distance, signal strength] for each pulse in the zoom Fourier transforms. The data string may start with a special character 911 such as "#" to simplify parsing. The barrier distance of 0.09 m and relative signal level of 1.55 are sent in distance-signal strength pair or group 912. The top of the fluid follows at 0.40 m in group 913 with the strongest signal level of 1.98. Following that is the distance and signal level of the oil-water interface in group 914, with a distance of 0.51 m and a much weaker signal level of 0.54. Groups 915 and 916 are spurious measurements that are discarded. This method can thus determine the interface between two dissimilar fluids by observing a distance pulse 906 immediately following the strongest distance pulse 905. The oil-water interface is a common example, but the liquid-liquid interface applies to any chemicals in settling tanks with different densities.

Figure 10:
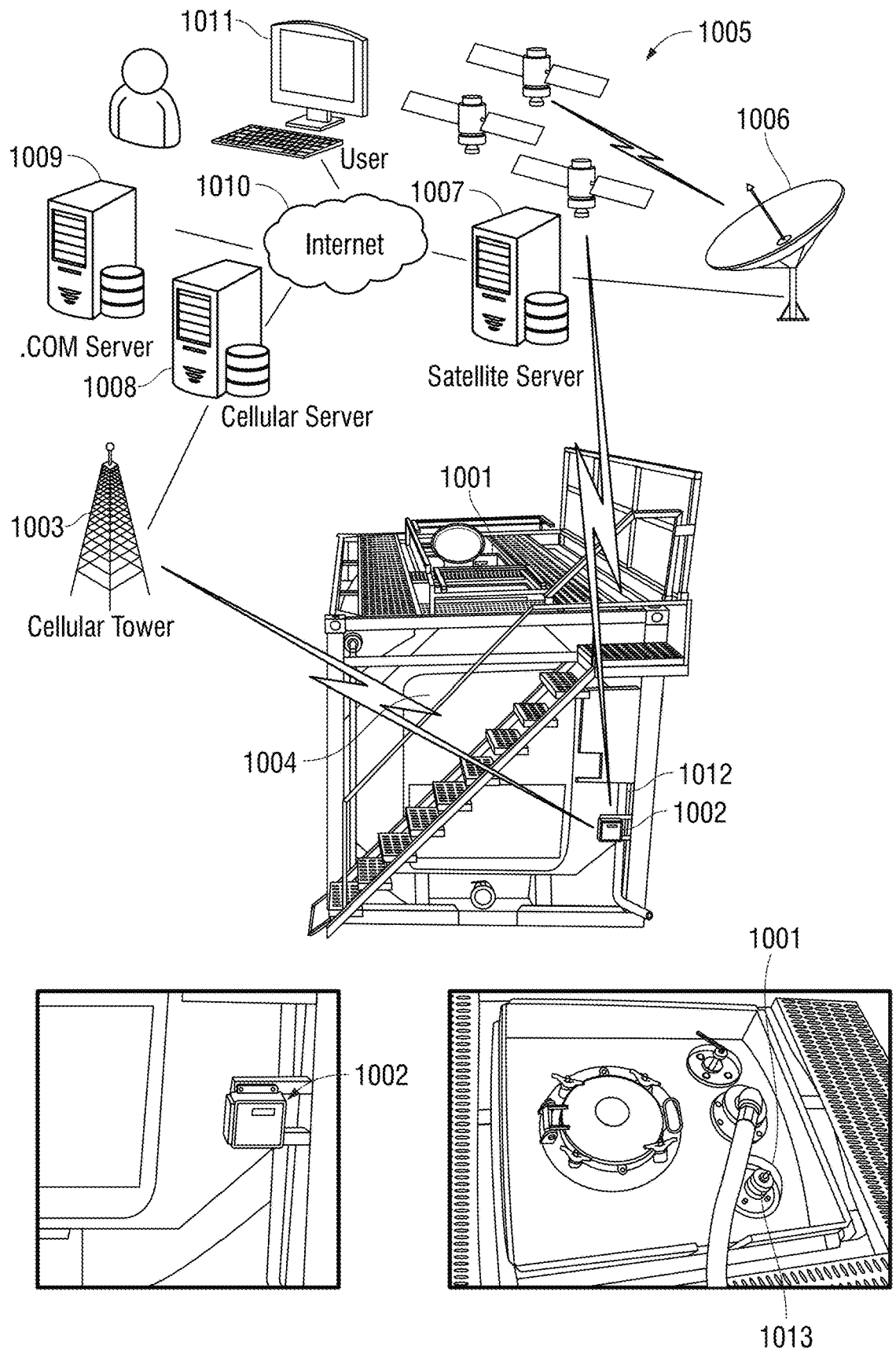
FIG. 10 illustrates exemplary installation of a tank level measurement instrument in accordance with various embodiments of this disclosure.

FIG. 10 depicts a typical installation of a mmWave Control unit 1001 on a chemical tank 1004. This tank 1004 is called an ISO tank and is popular because it can be stacked and easily configured and transported via rail, ship, and truck. Variations of this tank are common. The mmWave Control unit 1001 can be used on virtually any size tank on which it can be mounted at the top of the tank, typically using a 2-inch threaded hole in the top of the tank. The housing or enclosure of the mmWave Control unit 1001 can have a 2-inch cap molded into the housing for easy installation using this hole. It is also possible to mount the mmWave Control unit 1001 on the underside of the tank 1004 so that the radar signals travel upwards first through the fluid and then detect the air-fluid interface, but this arrangement may not be practical. The mmWave Control unit 1001 may also be placed directly on top of plastic tanks and attached with double sided tape or small screws or glue for quick installation since the mmWave signals can penetrate the plastic tank walls. Signal loss is higher but some situations may warrant this approach.

In FIG. 10, a wire 1012 may be run from the mmWave Control unit 1001 to the Telemetry Control unit 1002. The most common signal interface that may be used over wire 1012 is serial data to Telemetry Control unit 1002, but analog 4-20 mA, Fieldbus, Hart or other types of interface. The mmWave Control unit can be mounted on the top and the Telemetry Control unit on the side of the tank for easy access and to visually check current levels on the display. Telemetry Control unit 1002 may communicate wirelessly with a cellular tower 1003 and/or by satellite 1005 depending upon cellular coverage in the area. Other commonly used methods such as microwave or Wi-Fi signals can be used to transmit data as is often done in this industry. GPS location is also determined using GPS satellites 1005. The cellular provider collects data from remote tanks 1004 using servers 1008 which puts the data on the internet 1010. Satellite data is transmitted to base stations 1006 where the data is sent to satellite servers 1007 where the data may be accessed via the Internet. Data is collected from the cellular and satellite provider by server 1009 and web pages are generated for use by user 1011. These web pages can be designed to show current tank fluid levels, volume, tank level changes, days on site, location history, and the like. Data may be presented in graphical or tabular form. Text, email, and phone information reports are made by the server 1009 to user 1011 as needed or upon a tank alert condition or on a scheduled basis.

Figure 11:
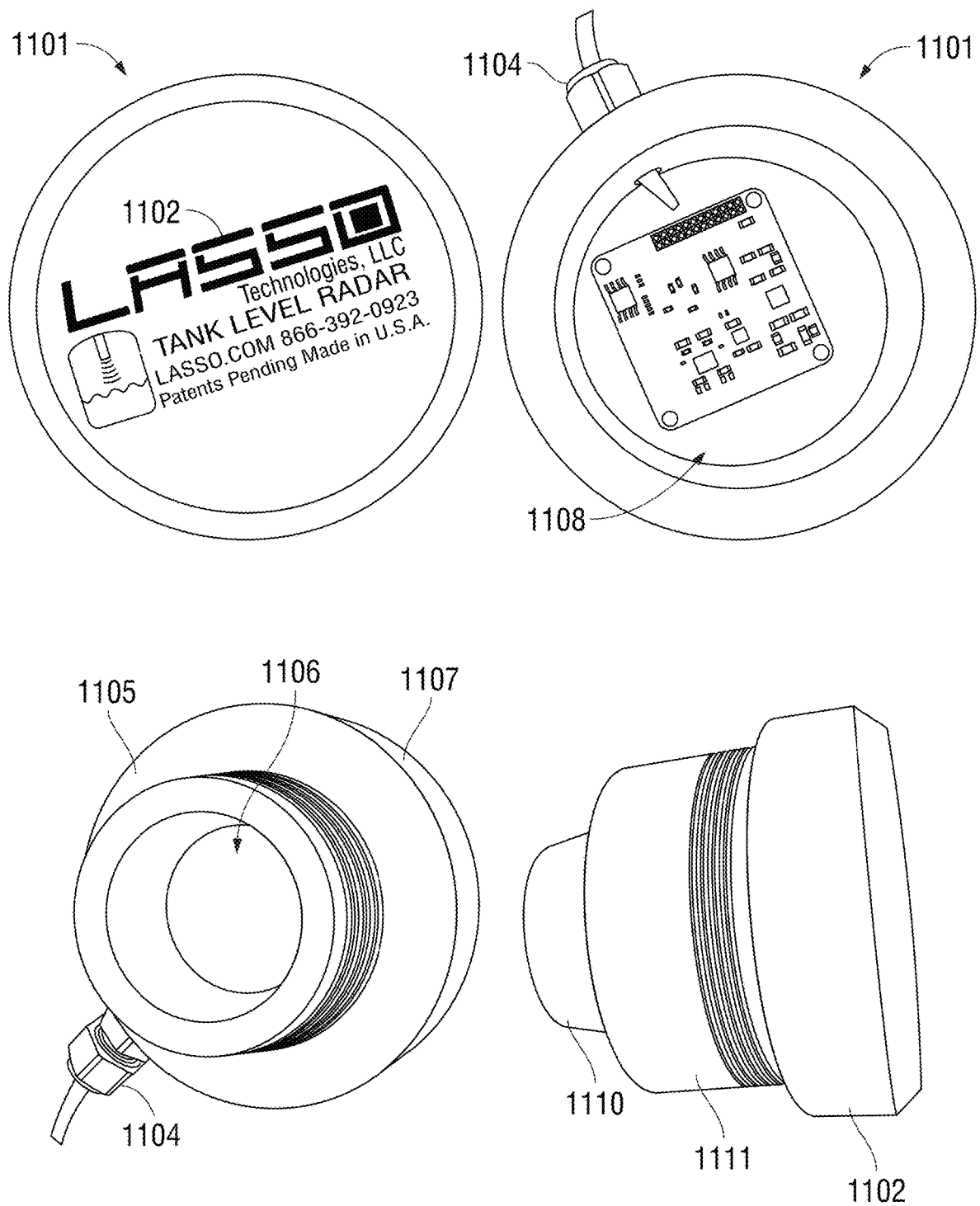
FIG. 11 illustrates an exemplary housing for a tank level measurement instrument in accordance with various embodiments of this disclosure.

FIG. 11 illustrates an exemplary housing 1101 for a mmWave Control unit such as the mmWave Control unit 1001 shown in FIG. 10. A circuit board 1103 of the mmWave Control unit sits at the bottom of a cavity 1108 in housing 1101 and is secured using screws. When the housing 1101 is properly mounted on the tank, the radar antennas 122 (see FIG. 1) are centered over the tank access hole (not expressly shown). Wire and strain relief 1104 attached to the housing 1101 provide power and communication lines to the mmWave Control unit. Lid 1102 screws onto body 1111 of the housing 1101. Many tanks use a common 2-inch NPT thread 1013 which makes installation of the tank level sensors disclosed herein straightforward. Threads 1110 and 1105 allow the radar module to be installed in the tank 1004 via 2-inch threaded holes therein. Radar passes through window 1106. The bottom of the window 1106 has a thin barrier or cover, which may be of plastic in some embodiments, to protect the radar sensor. This one-piece construction makesthe housing 1101 leak proof. A seal on the lid 1102 creates a fluid and tank pressure proof barrier. Wrench flats on the body 1111 allow the housing 1101 to be tightened onto the tank.

Figure 12:
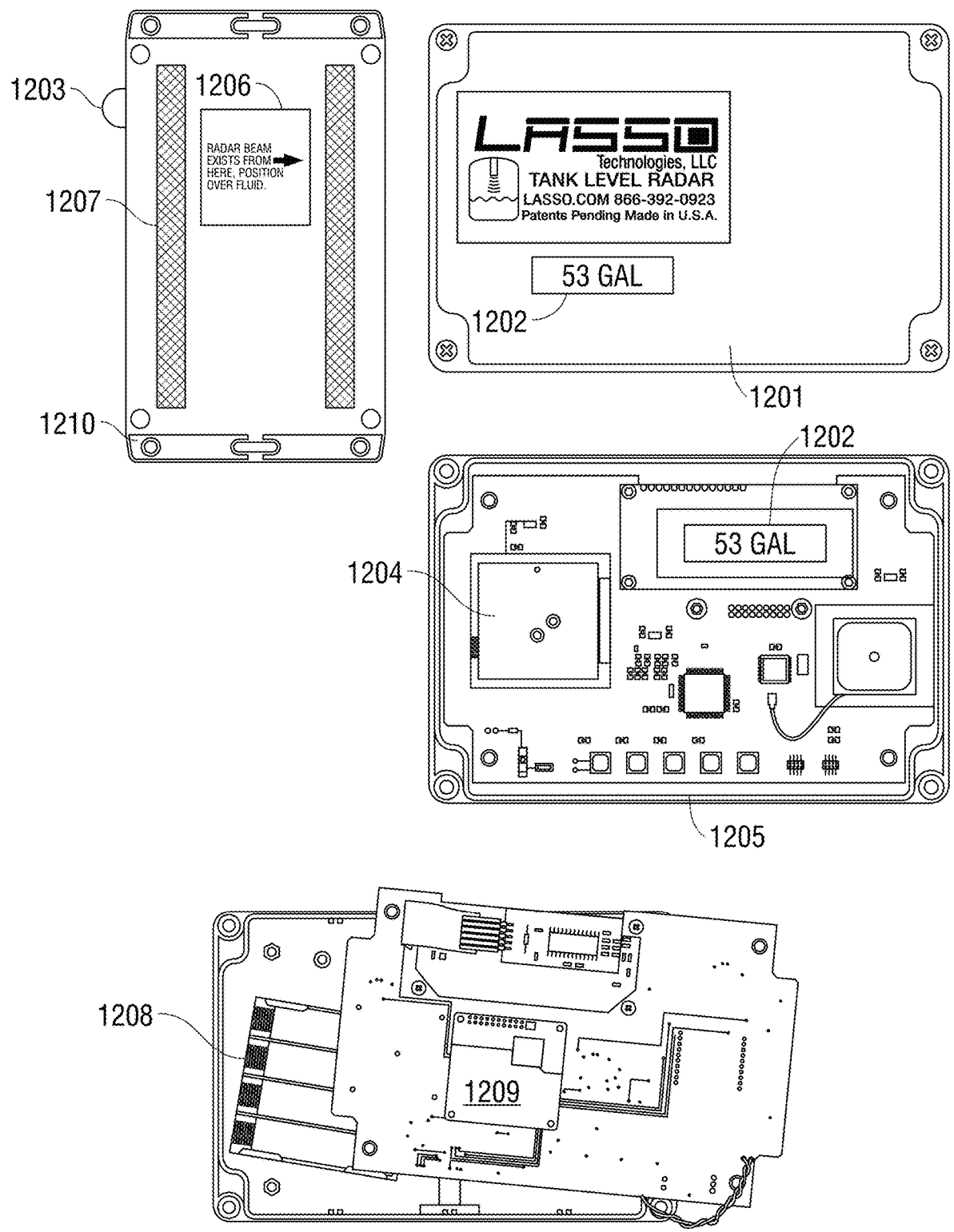
FIG. 12 illustrates an exemplary enclosure for a tank level measurement instrument in accordance with various embodiments of this disclosure.

FIG. 12 illustrates a radar-based telemetry system in a single enclosure 1201 similar to the single-board embodiment 210 discussed earlier (see FIG. 2C). Such a single enclosure embodiment 1201 is highly useful because installation of tank level measurement equipment can be arduous, requiring installation of the sensor, telemetry, conduit, and sometimes solar panels. In addition to installation difficulties, typical installations are difficult to replace in the field if a unit fails. This single enclosure configuration combines the Telemetry Control unit and mmWave Control unit in a single unit 1201 and allows the customer to quickly install a tank monitoring solution. The radar can transmit through plastic tank walls which makes it ideal for smaller plastic 'tote' containers. The self-contained unit 1201 can also work with conventional ISO tanks by mounting it on a flange cover or other adapter. The radar solution has double sided tape to allow the user to "peel and stick" a tank monitoring solution to a tank. If a tank monitor fails, the bad unit can be removed in seconds and a new tank monitor easily installed.

In FIG. 12, a Telemetry Control unit 1204 and a mmWave Control unit 1209 are shown mounted in single enclosure 1201. The Telemetry Control unit 1204 includes a display 1202 shows various types of information, such as the depth, volume (e.g., gallons), sensor error messages, setup messages, and the like. A manual wake early button 1203 allows the operator to get an immediate reading of the tank level. The mmWave Control unit 1209 typically faces the bottom of the plastic enclosure 1201 and the tank fluid when properly mounted. A label 1206 may be provided in some embodiments describing where the radar signal emanates from for proper alignment on a tank. Double-sided tape 1207 may be used to allow quick attachment to tanks. Screws holes 1210 allow screws to be used for attaching the enclosure 1201 to a tank. A battery pack 1208 may be provided to power the unit. The batteries may be rechargeable using solar panels in some embodiments.

Figure 13:
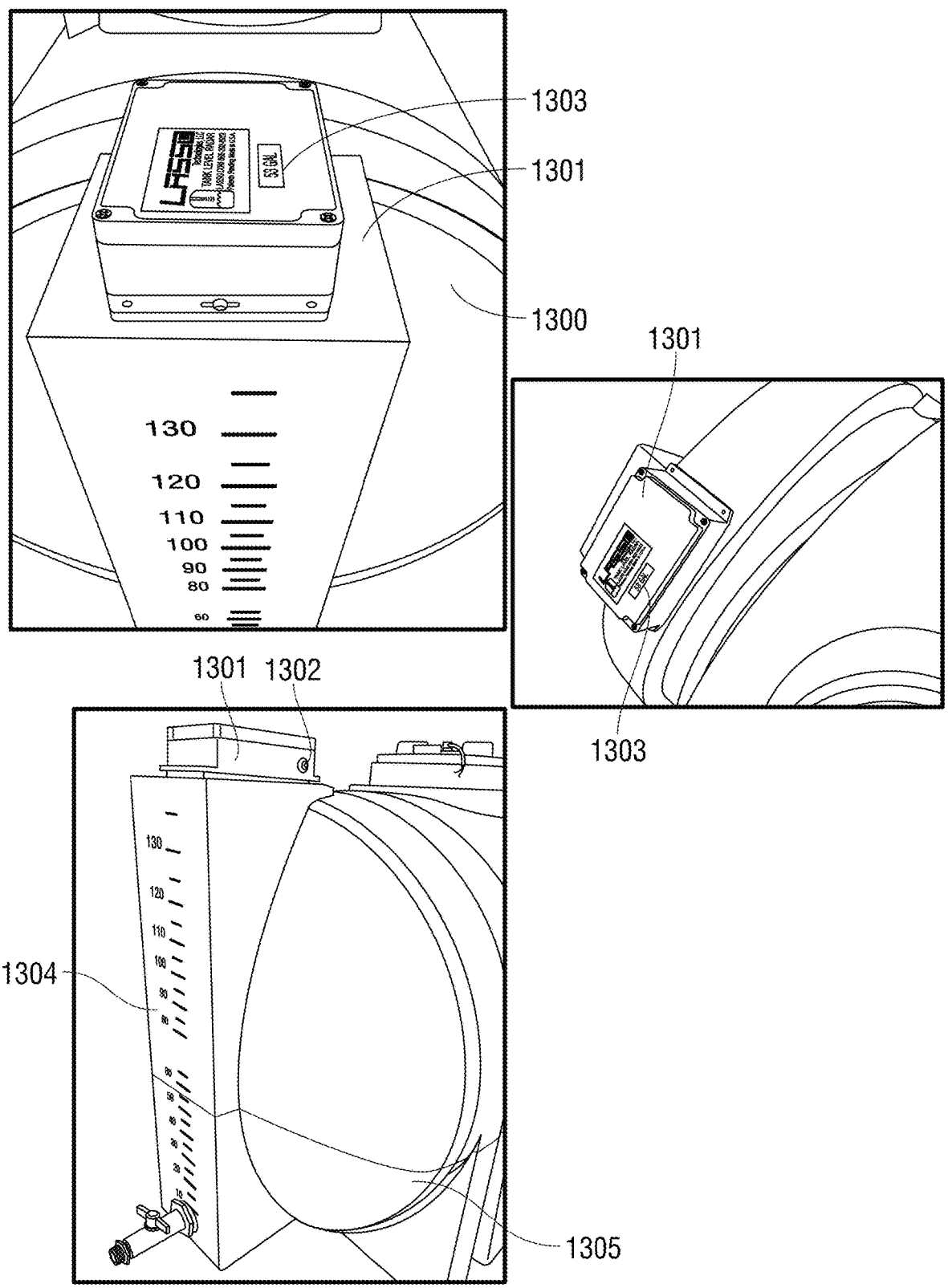
FIG. 13 illustrates an exemplary installation of an enclosure for a tank level measurement radar instrument in accordance with various embodiments of this disclosure.

FIG. 13 illustrates a mmWave Control unit and a Telemetry Control unit housed in the same enclosure 1301 similar to that described in FIG. 12. This figure shows a typical tank 1300 which holds a few hundred gallons of liquid chemicals such as fracking fluids. Typically, a person must monitor the fluid level using the level indicators 1304 marked on the side of the tank 1300. Users must typically check the amount of chemicals used several times per day and the chemical cannot run low or it may interrupt an expensive operation like an oil field fracking job. Embodiments of the invention make monitoring the tank 1300 much more convenient by providing an enclosure 1301 that is extremely easy to use and install, since no holes need to be drilled and the mmWave Control unit and Telemetry Control unit contained therein can read the tank level through the plastic tank wall even though it may be ½ inch thick. The radar passes through the tank wall and a return echo from the fluid is similarly received. Data may be sent to the user by cell or satellite several times per day and warnings sent if a low level is detected. The enclosure 1301 sits on top of the tank 1300. Display 1303 shows the user the status of the system and current level and volume. Fluid depth 1305 is determined using the mmWave Control unit in conjunction with the Telemetry Control unit as described above. A Wake Early button 1302 on the side of the enclosure 1301 allows a local user the ability to immediately read the fluid level at any time.

Figure 14:
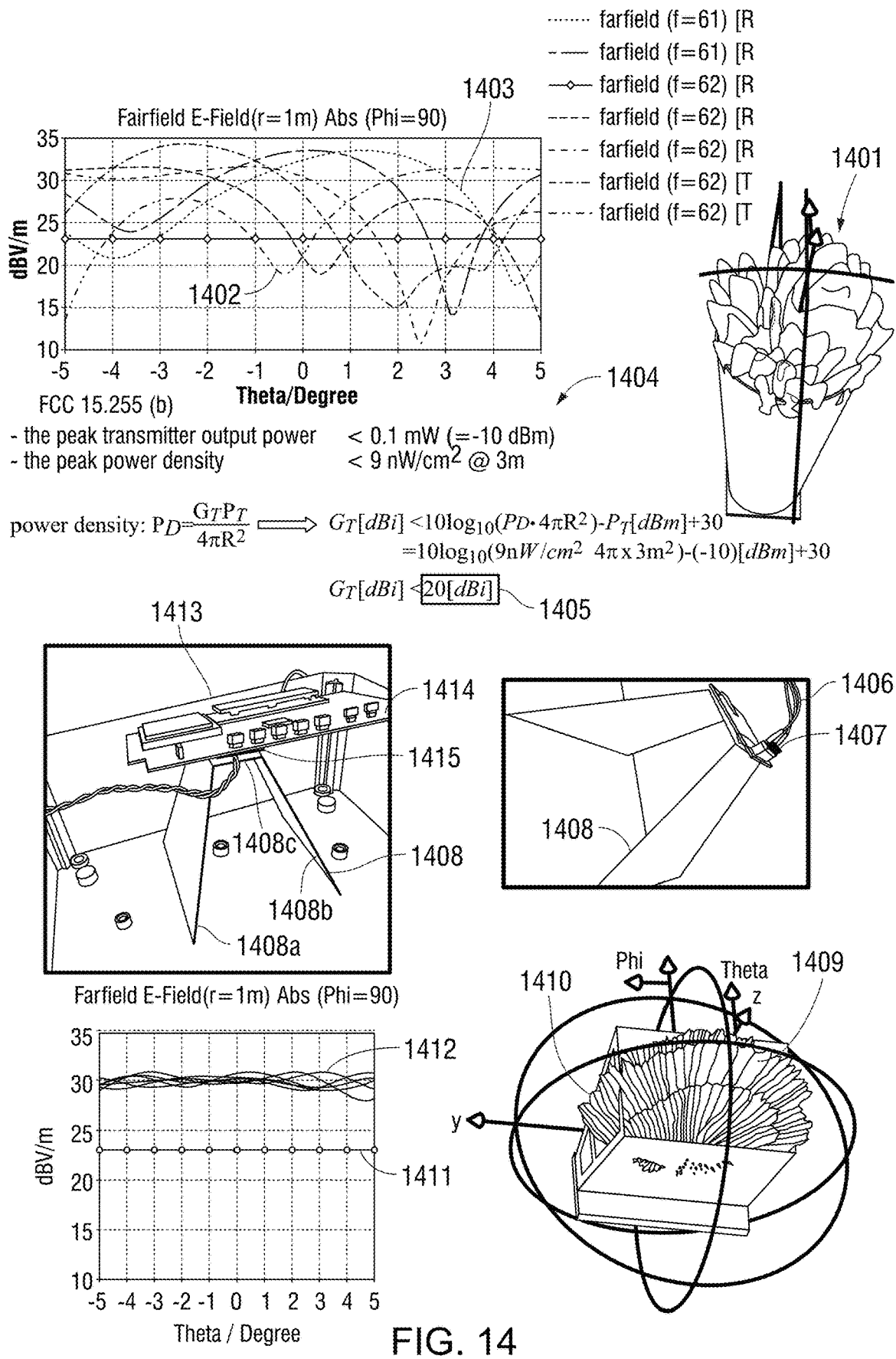
FIG. 14 illustrates an exemplary horn that may be used with a tank level measurement instrument in accordance with various embodiments of this disclosure.

FIG. 14 shows an exemplary radar horn 1408 that that may be used with the mmWave Control unit disclosed herein. The horn 1408 may be attached, for example, by placing the horn under the circuit board of the mmWave Control unit. While its use is not essential to the practice of the embodiments disclosed herein, the horn 1408 can enhance the ability of the mmWave Control unit to transmit and receive a signal through a plastic chemical tank wall. The use of the horn 1408 can increase overall gain of the mmWave Control unit and thus help the emitted signals penetrate thicker plastic tank walls. As mentioned earlier, some embodiments of the mmWave Control unit use multiple transmit and receive antennas so there are multiple signal paths, which makes using a typical conical radar horn impractical. Accordingly, a novel 2-sided horn is disclosed for use herein that does not result in multiple transmit and receive path lengths. The 2-sided horn can be used with mmWave Control unit because the main concern is elevation of the signal and not the azimuth direction of the signal. The additional elevation provided by the horn can be offset from the tank level measurements via a software adjustment in the mmWave Control unit or the Telemetry Control unit.

Referring to FIG. 14, when using a typical cone shaped radar horn, multiple and non-symmetrical paths 1401 may result. When there is no horn, the signal strength is flat over any angle, as indicated at 1402. A conical horn, however, results in varying signal strength relative the detected angle, as indicated at 1403, which is highly undesirable. The calculations that may be performed to determine the signal strength needed to stay within FCC limitations is shown at 1404, and the desired signal strength goal is indicated at 1405 (e.g., 20 dBi). The novel alternate horn design 1408 disclosed herein comprises two metal plates 1408a and 1408b connected at an angle to each other by a flat portion 1408c. The angle between the two metal plates 1408a and 1408b may be chosen as needed for a particular application, and may be about 30° in some embodiments. As can be seen, the horn 1408 can be open sided, since elevation is the main consideration and not azimuthal direction. Wires 1406 connect the horn 1408 to the mmWave Control unit 1407. Use of the horn 1408 results in relatively consistent signal strength emanating from the horn, as indicated at 1409, while side lobes 1410 escape out of the edges. The gain of the mmWave Control unit when no horn is in place is indicated at 1411. When the horn is used, total gain is relatively flat at any measurement angle, as indicated at 1412. A single housing or enclosure 1413 similar to the one described with respect to FIG. 12 may be used to house the horn 1408, the Telemetry Control unit 1114 (board), and the mmWave Control unit (board) 1415.

A person skilled in the art realizes that the present invention by no means is limited to the preferred embodiments described above. On the contrary, many modifications and variations are possible within the scope of the appended claims. For example, the user display and decision process may be located within the invention circuit and the telemetry circuitry may be incorporated in the invention circuit board if needed.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

What is claimed is:

1. A tank level instrument for measuring a distance from near a top of a tank to one or more fluids in the tank, comprising:
    a chirp generator operable to generate a millimeter wave chirp that ramps linearly from a starting frequency to a higher frequency within a specified time span;
    a transmit line configured to carry the chirp generated by the chirp generator for transmission into the tank;
    a receive line configured to carry one or more chirp reflections received from the tank,
    a mixer operable to mix the chirp carried by the transmit line with the chirp reflections received by the receive line to generate one or more intermediate frequency signals;
    a processing unit operable to process the one or more intermediate frequency signals and derive one or more distances from the one or more intermediate frequency signals, each distance representing the distance from near the top of the tank to one of the one or more fluids in the tank or an obstruction in the tank; and
    a computer operable to automatically select intermediate frequency signals having a signal strength above a predefined minimum or distances within a predefined distance window for further processing and ignore other intermediate frequency signals and distances.

2. The tank level instrument according to claim 1, wherein the starting frequency of the chirp is above 60 GHz and a bandwidth of the chirp is 4 Ghz or more.

3. The tank level instrument according to claim 1, wherein the processing unit is operable to process the one or more intermediate frequency signals using Zoom Fourier transform.

4. The tank level instrument according to claim 1, further comprising an enclosure mounted on the tank over an opening in the tank, the enclosure isolating the chirp generator, the transmit line, the receive line, the mixer and the processing unit from the tank, the enclosure being made partly or entirely of a material having a dielectric constant that is sufficiently low to allow the chirp and the chirp reflections to pass through the enclosure with a signal strength loss that is less than a specified minimum.

5. The tank level instrument according to claim 4, wherein the material of the enclosure has a dielectric constant that is less than 5.

6. The tank level instrument according to claim 4, wherein the material of the enclosure is impervious to the one or more fluids in the tank.

7. The tank level instrument according to claim 4, wherein the same enclosure also isolates the computer from the tank.

8. The tank level instrument according to claim 4, wherein the computer is operable to ignore distances representing the distance between the top of the tank and chemical residue that may collect on the enclosure.

9. The tank level instrument according to claim 1, wherein the computer is operable to ignore distances that represent the distance between the top of the tank and one or more of foam, gas, fog, mist, ice, sand, debris, chemical residue, and obstructions in a tank.

10. The tank level instrument according to claim 1, further comprising wireless telemetry connected to the computer and operable to transmit the distances selected by the computer to a remote location.

11. The tank level instrument according to claim 10, wherein the wireless telemetry includes one or more of cellular telemetry and satellite telemetry.

12. The tank level instrument according to claim 1, wherein the computer is further operable to identify a dissimilar fluid interface by determining whether a first intermediate frequency signal is followed by a second intermediate frequency signal having a lower signal strength than the first intermediate frequency signal, both the first and second intermediate frequency signals having signal strengths above the minimum.

13. The tank level instrument according to claim 1, wherein the tank level instrument a self-contained unit.

14. The tank level instrument according to claim 1, further comprising a visual display for allowing a user to selectively display a fluid level or a fluid volume in the tank.

15. The tank level instrument according to claim 1, wherein the processing unit is operable to send the one or more intermediate frequency signals to an external computer for further processing.

16. The tank level instrument according to claim 1, further comprising an open-sided horn connected to the transmit line, the open-sided horn composed of two plates connected to each other at an angle.

17. A tank level instrument for measuring a level of fluid in a tank, comprising:
a mmWave Control unit configured to generate a millimeter wave chirp that ramps linearly from a starting frequency to a higher frequency within a specified time span, the mmWave Control unit further configured to transmit the chirp into the tank and receive one or more chirp reflections from the tank, the mmWave Control unit further configured to mix the chirp with the chirp reflections to generate one or more intermediate frequency signals and process the one or more intermediate frequency signals to derive one or more distances, each distance representing the distance from near a top of the tank to a fluid in the tank or an obstruction in the tank; and
a Telemetry Control unit configured to automatically select intermediate frequency signals having a signal strength above a predefined minimum or distances within a predefined distance window for further processing.

18. The tank level instrument according to claim 17, further comprising a single enclosure, wherein the mmWave Control unit and the Telemetry Control unit are enclosed within the single enclosure.

19. A method of measuring a level of fluid in a tank, comprising:
generating, at a chirp generator, a millimeter wave chirp that ramps linearly from a starting frequency to a higher frequency within a specified time span;
transmitting, via a transmit line, the chirp into the tank;
receiving, via a receive line, one or more chirp reflections from the tank;
mixing, at a mixer, the chirp with the chirp reflections to generate one or more intermediate frequency signals;
processing, at a processing unit, the one or more intermediate frequency signals to derive one or more distances, each distance representing the distance from near a top of the tank to a fluid in the tank or an obstruction in the tank; and
automatically selecting, at a computer, intermediate frequency signals having a signal strength above a predefined minimum or distances within a predefined distance window for further processing.

20. The method according to claim 19, wherein the generating, transmitting, receiving, mixing, processing, and automatically selecting are performed from within a single enclosure.

* * * * *